3,354,060
PROCESS FOR THE FORMATION OF A FUEL CELL ELECTRODE CONTAINING AN INTIMATE MIXTURE OF PLATINUM AND A SECOND METAL
Ralph W. Carl, Munster, Ind., assignor to Standard Oil Company, Chicago, Ill., a corporation of Indiana
No Drawing. Filed July 31, 1963, Ser. No. 299,113
9 Claims. (Cl. 204—35)

This invention relates to a process for preparing a platinum electrode for a fuel cell wherein the platinum layer on the electrode support contains an intimate mixture of platinum and a second metal, generally a transition metal. In particular, it relates to an electrochemical method for producing the intimate mixture and/or an electrochemical method of removing part of the second metal from the platinum layer to improve the performance of the electrode and reduce its activation polarization when utilized in a fuel cell. In addition, the invention relates to the electrodes produced by the processes.

Fuel cells and their operation are generally known and are described in co-pending application S.N. 299,065, filed July 31, 1963, which is partially directed to the formation, at a high temperature, of an intimate mixture of platinum and a second metal in the platinum layer of the electrode, and the subsequent removal of part of the second metal from the platinum layer. The resulting electrode was superior to that produced without the high temperature treatment and without the removal step. The formation of the intimate mixture and the removal step reduced the energy (or activation polarization) required to activate the fuel or oxidant.

Although the high temperature treatment produced a very desirable platinum electrode, the procedure was not entirely satisfactory. Usually, salts of the metals were first impregnated on the electrode support and reduced to their metallic form, the electrode then being subject to the high temperature treatment. The complexities of his procedure plus the necessity for the high temperature treatment resulted in a need for a simpler procedure.

An object of this invention is a simple method for producing the intimate mixture in the platinum layer. Another object is a method which does not require the high temperature treatment. Still another object is a convenient method of carrying out the removal of part of the second metal, especially one which may be carried out in conjunction with the formation of the intimate mixture. Other objects will be apparent from the detailed description of the invention.

It has been discovered that the important intimate mixture is produced by the electroyltic deposition of platinum and the second metal on the electrode support. The resultant electrode exhibits a low activation polarization which is highly desirable. This process offers the simplicity of proceeding directly to the intimate mixture from the salts of the metals, without requiring the prior impregnation and reduction steps with the salts. In addition, and equally important, the process does not require the high temperature treatment previously employed. It has also been discovered that the removal of a portion of the second metal from the platinum layer can be carried out by electrochemical dissolution.

Briefly, the inventive process is one for preparing a platinum electrode which exhibits a low activation polarization and comprises a platinum layer containing an intimate mixture of platinum and a second metal on an electrode support. In the process, the intimate mixture is formed by the electrolytic deposition of platinum and second metal on the electrode support. It includes the removal of part of the second metal from the platinum layer to improve the performance of the electrode, especially as carried out by electrochemical dissolution.

The platinum electrode is descriptive of a general type of electrode employed in the fuel cells and comprises a platinum layer containing an intimate mixture of platinum and a second metal on an electrode support. The platinum layer is descriptive of the film of catalytic material on the electrode suport. The intimate mixture is descriptive of a combination of platinum and the second metal, normally in a finely divided form and includes various stages of alloy formation. The electrode support is descriptive of a structure having a high surface area for supporting the platinum layer. Usually, it is porous and electrically conducting, such as porous carbon, for increased surface area. The second metal is one which forms a combination with platinum. Usually it is a transition metal capable of being plated and having an atomic number of 21–76 or an earth metal having an atomic number of 58 or 90; and more commonly, a transition metal having an atomic number of about 22–29 (titanium, vanadium, chromium, manganese, iron, cobalt, nickel, and copper), although other of the transition metals such as molybdenum and silver are also suitable. The preferred range is descriptive of metals which result in very desirable electrodes and are commonly available. Especially preferred are chromium, manganese, nickel and copper; and particularly nickel and copper.

The intimate mixture naturally includes a mixture having one or more of the second metals in combination with the platinum, and in some instances preferably has two or more second metals because of the resulting improved efficiency of the electrode. The platinum layer also may include other components, such as free second metal, and preferably includts a free second metal when the removal of a part of the second metal is carried out. These and other descriptions relating to the invention are further amplified in co-pending application S.N. 299,065.

Normally, the atomic ratio of platinum to the second metal in the intimate mixture in the electrodes is in the order of about 0.1 to about 50 (although ratios outside this range may also be employed), preferably about 1 to about 10, and especially about 4–5. Naturally, when part of the second metal is removed from the platinum layer in the process, additional amounts of the second metal are commonly present, prior to the removal step. It has previously been found that the level of platinum on the electrode support should be above a certain minimum for the electrode to perform satisfactorily. This minimum is normally about 0.4–0.5 wt. percent based on the electrode support but may vary depending on the surface area of the platinum on the support and the surface area of the support. Normally, the platinum is present in about 0.5–10 wt. percent of the electrode.

The process comprises forming the intimate mixture by the electrolytic deposition of the platinum and the second metal on the electrode support. Electrolytic deposition is intended to described the deposition of the metals by the passage of an electrical current. Usually the electrode support is electrically conductive and serves as the plating electrode.

Generally and preferably, the electrolytic deposition is carried out in the plating bath, especially one containing salts of platinum and the second metal. The relative concentrations of the salts depend on the particular metals, their salts, and the concentration of the metals in the initial deposit and the desired intimate mixture. The plating bath is usually an aqueous solution of the salts, such as the soluble acetates, nitrates chlorides, sulfates and the like, of the metals. With copper, the nitrate is preferred since it is readily available and produces very desirable results. Chloroplatinic acid ($H_2PtCl_6$) is very satisfactory as the platinum salt. Complexing agents, such as cyanide, ammonia and aminoalcohols (aminoethanol) may be employed to affect the solubility of the metals and their salts, and the electrical characteristics of the process.

Generally the voltages for the electrolytic deposition are in the order of 2-6 volts but may be outside the range. Currents are generally in the order of about 1-100 ma./cm.$^2$, and more commonly, about 10-50 ma./cm.$^2$, but are naturally determined from the resistance in the circuit. Typically, at 4 volts a current of about 40 ma./cm.$^2$ provides a very desirable intimate mixture, especially from a solution prepared from $H_2PtCl_6$ and $Cu(NO_3)_2$, and particularly when these metals are in a respective atomic ratio of about 0.0095 (in the salt solution).

The prior process also employed a removal step in which part of the second metal was removed from the platinum layer to produce increased amounts of exposed intimate mixture in the electrode. This removal is easily carried out by electrochemical dissolution of the second metal, particularly when coupled with the electrochemical formation of the intimate mixture. In the removal, a voltage of opposite sign is applied to the plated electrode and part of the second metal is removed. Typically, such voltage is in the order of 2-6 volts with currents being in the order of 1-100 ma./cm.$^2$, and especially about 4 volts at 40 ma./cm.$^2$.

The electrochemical dissolution offers particular advantages when coupled with the electrochemical formation of the intimate mixture since, in the process, part of the second metal is initially transferred from the plating solution to the electrode support, and then is removed by electrochemical dissolution and returned to the solution. When the entire process is carried out by periodically changing from the electrochemical formation step to the electrochemical removal step, part of the second metal is re-usable. Typically, this is carried out by periodically reversing the polarity of the electrode in the plating bath.

Another very desirable procedure is to carry out the electrolytic deposition step in the presence of a strong oxidizing agent to oxidize part of the second metal. Such oxidation includes the replacement of hydrogen in an acid by the second metal or the formation of salts of the second metal from the reduction of the anion portion of the agent $(2NO_3^- \rightarrow N_2O_4 + 2O^{--})$. Such agents include nitric acid, sulfuric acid, hydrochloric acid and the like. Nitric acid is preferred since it produces desirable results with copper and other second metals.

The platinum electrode produced from the above described processes is very suitable for use in a fuel cell and in many instances, exhibits surprisingly good performance at low platinum levels. The electrode may serve as the fuel or oxidant electrode in a cell utilizing either an acid or alkaline electrolyte. Gaseous fuels include olefins having about 2-4 carbon atoms and paraffins having about 1-4 carbon atoms. Liquid fuels such as methanol and ethanol may also be employed and are preferred. Solutions of fuel in electrolytes are also very suitable. Oxidants include air and oxygen. Acidic electrolytes include those from sulfuric acid and phosphoric acid, particularly those prepared from a paste made from sulfuric acid, silica gel and fibrous glass. Alkaline electrolytes include alkaline hydroxides, carbonates and bicarbonates, particularly those of potassium.

While the fuel cell is normally a low temperature cell, the inventive processes are not limited thereto. The formation of a highly divided platinum layer having a large surface area also offers many advantages for high temperature fuel cells.

The following example illustrates the preparation and utilization of some embodiments of this invention. It will be understood that these are for illustrative purposes only and do not purport to be wholly definitive with respect to conditions or scope.

EXAMPLE I

An electrode was prepared by plating platinum and copper on porous carbon cloth. The plating bath was prepared from $H_2PtCl_6$ and $Cu(NO_3)_2$ and contained the metals in a respective atomic ratio of about 0.0095. A few cc. of nitric acid were also present.

The carbon cloth was approximately 2½ inches by 5 inches. Two of these cloths were spaced approximately 1¼ inches apart in the plating bath and served as the electrodes.

A potential of approximately 4 volts was applied to the electrodes which produced approximately 40 ma./cm.$^2$. One electrode served as the cathode for three plating periods of approximately 40 seconds each. The polarity was reversed between these periods, which changed the cathode to an anode, each reversal occurring for approximately 40 seconds.

The electrodes were then washed in distilled water and dried, after which they were inserted into a dilute sulfuric acid bath. The original cathode was treated as an anode for approximately 90 seconds, after which the electrodes were removed and washed in distilled water. After being dried, the electrodes were inserted into a 10 wt. percent potassium sulfate bath and the original cathode was treated as a cathode for approximately 40 seconds. Washings with distilled water and drying were then carried out.

The original cathode was tested as an oxygen cathode in a cell of the sandwich type in which an electrolyte layer of sulfuric acid paste (made up of 2.1 N $H_2SO_4$, Cabosil, and glass fibers) was between the two catalyzed carbon cloth electrodes, each having an exposed area of approximately 4 sq. in. Cabosil is a silica gel. Teflon frames were used to contain the electrolyte and electrodes and to direct the flow of gases properly through the assembly. Teflon-coated brass end plates served to hold the cell together. Platinum foil served as test leads to the electrodes.

The test was carried out at a temperature of approximately 125° C. and a pressure of approximately 100 p.s.i.g. In the test the anode was swept with nitrogen and the cathode was fed with oxygen (saturated with water vapor at a temperature approximately 2° C. below the cell temperature).

The results of the test are reported below for the oxygen electrode compared to a normal hydrogen electrode, together with the platinum and copper analyses of the electrode (determined after the test). Results for comparison purposes are also reported for (1) an oxygen electrode prepared from the electrolytic deposition of platinum (without copper) on the carbon cloth (control electrode), and (2) an oxygen electrode prepared by heating a carbon cloth support impregnated with platinum and copper to approximately 1000° C. for 2 hours.

TABLE I.—POTENTIAL VS. N.H.E.

| Current, ma./cm.$^2$ | Cu-Pt Electrode Electrolytic Deposition | Control | Cu-Pt Electrode (Thermal Preparation) |
|---|---|---|---|
| 0 | 0.96 | 0.84 | 0.93 |
| 2 | 0.85 | 0.73 | 0.84 |
| 12 | 0.80 | 0.66 | 0.75 |
| 40 | 0.78 | 0.58 | 0.64 |
| Wt. Percent Pt | 0.52 | | |
| Wt. Percent Cu | 0.038 | | |
| At. Ratio Pt/Cu | 4.44 | | |

The above results demonstrate the superior performance of the electrolytically prepared, copper-platinum electrode over the control, and the favorable performance when compared with the thermally prepared, copper-platinum electrode. At zero and 2 ma./cm.$^2$ where the adverse effects of activation polarization are especially noted, the copper-platinum electrode produced 0.96 volt and 0.85 volt compared to only 0.84 and 0.73 volt for the control and to 0.93 and 0.84 volt for the thermally prepared electrode. This indicated that an intimate mixture of platinum and copper had resulted from the electrolytic deposition and was similar to that of the thermally prepared copper-platinum electrode; which was surprising, since the electrolytic deposition had been carried out at a low temperature. In addition, the surprising performance of the electrolytically-prepared electrode was also unexpected since analysis revealed approximately 0.52 wt. percent platinum and 0.038 wt. percent copper on the support. This indicated that the electrolytically-prepared platinum electrode produced very desirable voltages with less platinum content than appeared to be on the control (estimated at 3 wt. percent).

Thus having described the invention, what is claimed is:

1. A process for preparing a platinum electrode exhibiting a low activation polarization, said electrode comprising a predominantly platinum layer containing an intimate mixture of platinum and copper on a porous electrode support, which process comprises forming said intimate mixture by the electrolytic codeposition of said platinum and said copper on said support, and removing a portion of said copper from said platinum layer to increase the internal surface area of said platinum layer and expose additional amounts of said intimate mixture.

2. The process of claim 1, wherein said electrolytic deposition is carried out in a plating bath containing a plating electrode, said support being said plating electrode.

3. The process of claim 1 wherein said electrolytic deposition is carried out in the presence of a strong oxidizing acid.

4. The process of claim 3 wherein said oxidizing acid is nitric acid.

5. The process of claim 1 wherein the atomic ratio of said platinum to said copper in said intimate mixture is from about 0.1 to about 50.

6. The process of claim 1 wherein the atomic ratio of said platinum to said copper in said intimate mixture is from about 1 to about 10.

7. The process of claim 1 wherein said removal is carried out by electrochemical dissolution.

8. The process of claim 7 wherein said electrolytic deposition is carried out in a plating bath containing a plating electrode, said support being said electrode, and said removal is carried out by periodically reversing the polarity of the electrode.

9. The process of claim 7 wherein said electrolytic deposition is carried out in an aqueous plating bath, containing an oxidizing acid, prepared from $H_2PtCl_6$ and $Cu(NO_3)_2$, said platinum and copper being in an atomic ratio of about 0.0095, said electrode support is porous carbon and is the plating electrode, and said removal step is carried out by periodically reversing the polarity of the electrode.

References Cited

FOREIGN PATENTS

| | | |
|---|---|---|
| 623,360 | 7/1961 | Canada. |
| 7,853 | 2/1894 | Great Britain. |
| 908,436 | 10/1962 | Great Britain. |
| 139,476 | 11/1960 | U.S.S.R. |

OTHER REFERENCES

Chemical Abstracts, vol. 48, pp. 13479–13480, 1954.

Gray, A. G., "Modern Electroplating," pp. 497 and 499–500, 1953.

Reilly, Joseph et al., "Physico-chemical Methods," vol. II, pp. 608–609, 1954.

JOHN H. MACK, *Primary Examiner.*

G. KAPLAN, *Assistant Examiner.*